United States Patent [19]

Wilke

[11] 4,284,070
[45] Aug. 18, 1981

[54] SOLAR ENERGY AIR ROOF

[76] Inventor: Douglad A. Wilke, 38 Roosevelt Ave., Glen Head, N.Y. 11545

[21] Appl. No.: 118,904

[22] Filed: Feb. 6, 1980

[51] Int. Cl.³ .............................................. F24J 3/02
[52] U.S. Cl. ................................... 126/450; 126/448
[58] Field of Search .............................. 126/428–432, 126/445, 446, 448, 449, 450, DIG. 2

[56] References Cited

U.S. PATENT DOCUMENTS

| | | | |
|---|---|---|---|
| 4,194,498 | 3/1980 | Mayerovitch | 126/450 |
| 4,214,575 | 7/1980 | Hopper | 126/450 |
| 4,215,675 | 8/1980 | Embree | 126/448 |

*Primary Examiner*—James C. Yeung
*Attorney, Agent, or Firm*—M. Howard Silverstein; David G. McConnell

[57] ABSTRACT

A ready-to-assemble kit for a solar air heater including (a) a prefabricated, substantially closed heating chamber to be disposed upon a base member, (b) guide strips to be secured to the base member around the perimeter of the chamber, and (c) glazing supports having elongated slots along their bottoms, which slots are keyed to snuggly fit over the guide strips.

11 Claims, 12 Drawing Figures

SOLAR ENERGY AIR ROOF

BACKGROUND (1) Field of Invention

This invention relates to solar heated dwellings wherein air is heated by the sun as it passes beneath a glazing, and is thereafter employed to heat the dwelling.

(2) Description of the Prior Art

During the past several years there has been considerable activity in the art of solar house heating. A wide variety of systems have been developed including systems for directly heating air in a solar collector, and blowing such heated air into the rooms of the house, or storing such heat in an energy collector (e.g., a bed of rocks) for later use in the house. The main problem with all of such systems is one of cost. For this reason, the public has been hesitant to incorporate these mechanisms into existing homes or to include same in the building of new homes.

SUMMARY

I have now developed a comparatively inexpensive apparatus which can be readily assembled on site by the do-it-yourselfer, and which utilizes the above-described prior art technique of heating air directly beneath a piece of glazing. Generally, the kit comprises:

a. a prefabricated, integral heating chamber to be placed upon a planar-shaped base, which chamber is essentially closed on its roof and along two parallel sides, which chamber is substantially closed on its floor, wherein the chamber includes a protruding segment extending downward from its floor, wherein the protruding segment is of sufficient length to extend through a hole in the base when the kit is assembled;

b. a plurality of guide strips to be attached to the top of the base, wherein the strips surround the perimeter of the chamber when the kit is assembled; and c. a set of elongated glazing supports to be attached to the top of the base; wherein each of the supports lie parallel to and cover one of the guide strips when attached to the top of the base; wherein each support includes a slot along the length of its bottom; wherein the slot is deep enough and just wide enough to fit over and engage the sides of one of the strips; and wherein the supports provide a glazing frame when attached to the top of the base.

DESCRIPTION OF PREFERRED EMBODIMENTS

Figure 1:
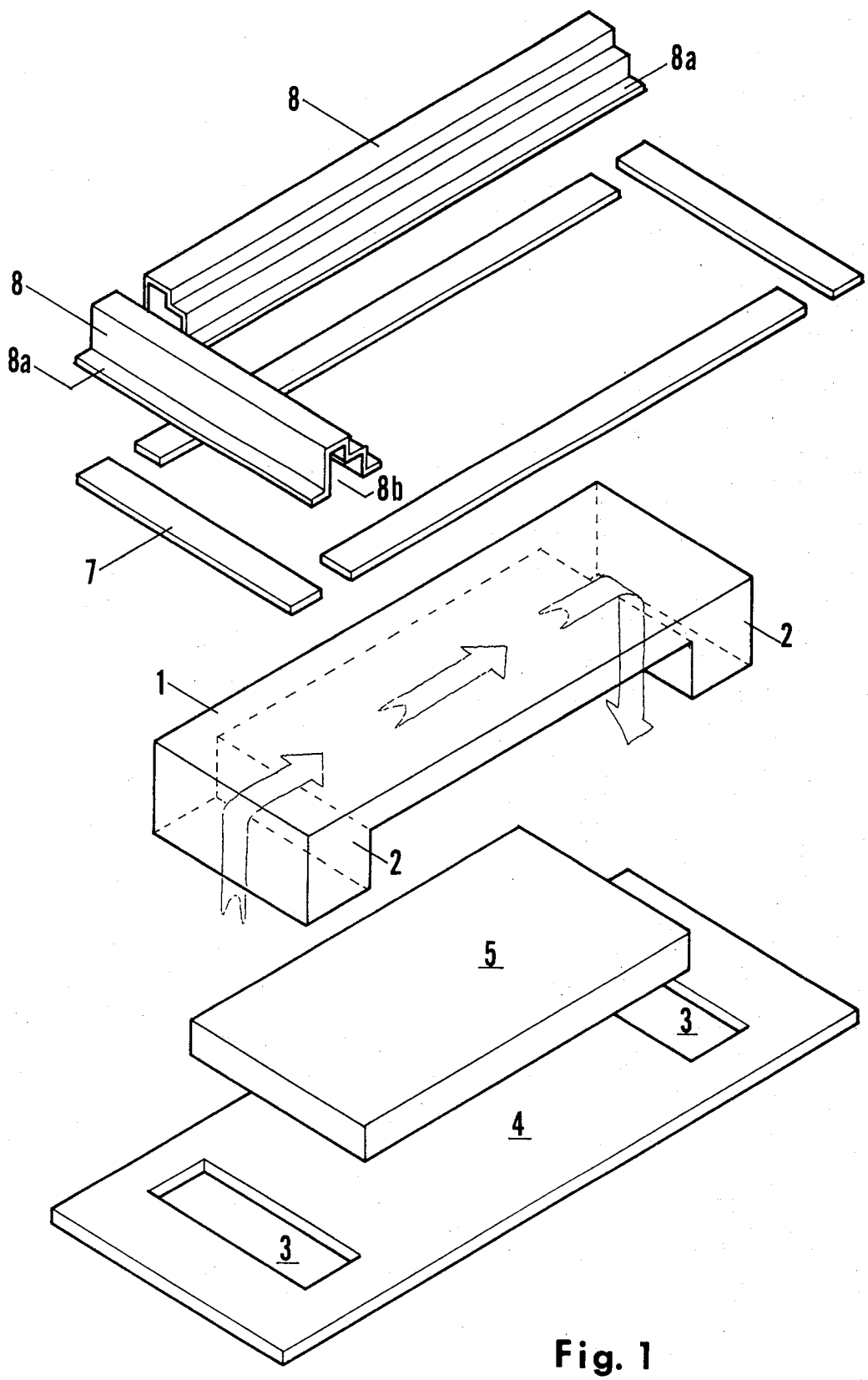
FIG. 1 is an exploded, perspective, partial view of the basic components of the present invention.

Referring to FIG. 1, reference numeral 1 designates a heating chamber 1 having segments 2 extending downward from the bottom thereof. These protruding segments are open at their extremities to permit passage of air through the chamber, as illustrated by the arrows. The roof of chamber 1 may be painted black as is well known in the solar heating art.

When assembled, segments 2 extend through holes 3 in planar-shaped base 4 which may be fabricated from 4'×8' sheets of ¾-inch exterior plywood nailed to a wooden framework in the prior art manner, e.g., standard roof construction. A piece of rigid insulation 5, e.g., isocyanurate, may be sandwiched between the heating chamber and the base.

Figure 1A:
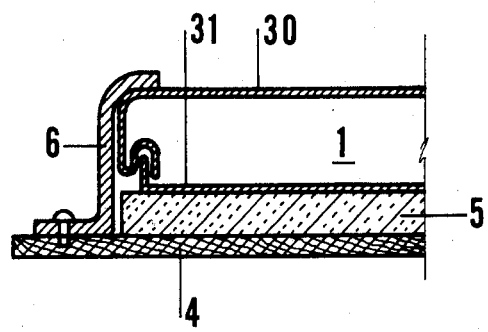
FIG. 1a is a cross-sectional view of a transverse cut of the partially assembled kit.

As seen in FIG. 1a, which is a transverse cross-sectional view of the partially assembled kit, chamber 1 and insulation 5 may be held in place on base 4 by tie-down strips 6 along the chamber's longitudinal edges. As further shown therein, chamber 1 may be fabricated from two pieces of sheet metal 30 and 31 crimped together along the chamber's longitudinal edges, which is a wellknown technique in the sheet metal working art.

Referring again to FIG. 1, the kit further includes guide strips 7 to be nailed or otherwise secured to base 4 to surround the perimeter of heating chamber 1 and to be covered by glazing supports 8 when the kit is assembled. The glazing supports may be fixed to the base by means of nails through lips 8a. Preferably, guide strips 7 are secured to the base before holes 3 are cut therein and before the heating chamber is placed thereupon.

Guide strips 7, which may be fabricated from one and one-half inch strips of half-inch plywood, constitute an important aspect of the invention. More specifically, once guide strips 7 are accurately secured to base 4, it is a comparatively simple task to complete the remaining assembly of the kit. That is, glazing supports 8 are easily, snuggly fitted over the guide strips, due to the fact that the width of bottom slot 8b of each support is properly matched to the width of its respective guide strip. Therefore, accurate placement of guide strips 7 automatically results in the glazing supports 8 being quickly and precisely positioned on base 4.

Precise placement of the glazing supports is critical so that pre-cut glazing panes will properly seat in the framework created by the supports. The chance of an error in frame size in an apparatus of this type is especially pronounced when the kit incorporates a substantial number of glazing panes in a manner later described.

The installation of a multi-pane kit without benefit of the guide strips 7 becomes a tedious, trial-and-error, overly expensive task not suitable for the do-it-yourselfer, because it is quite difficult to accurately position and secure the glazing supports in comparison to the smaller, lighter and therefore more easily handled guide strips.

Figure 2:
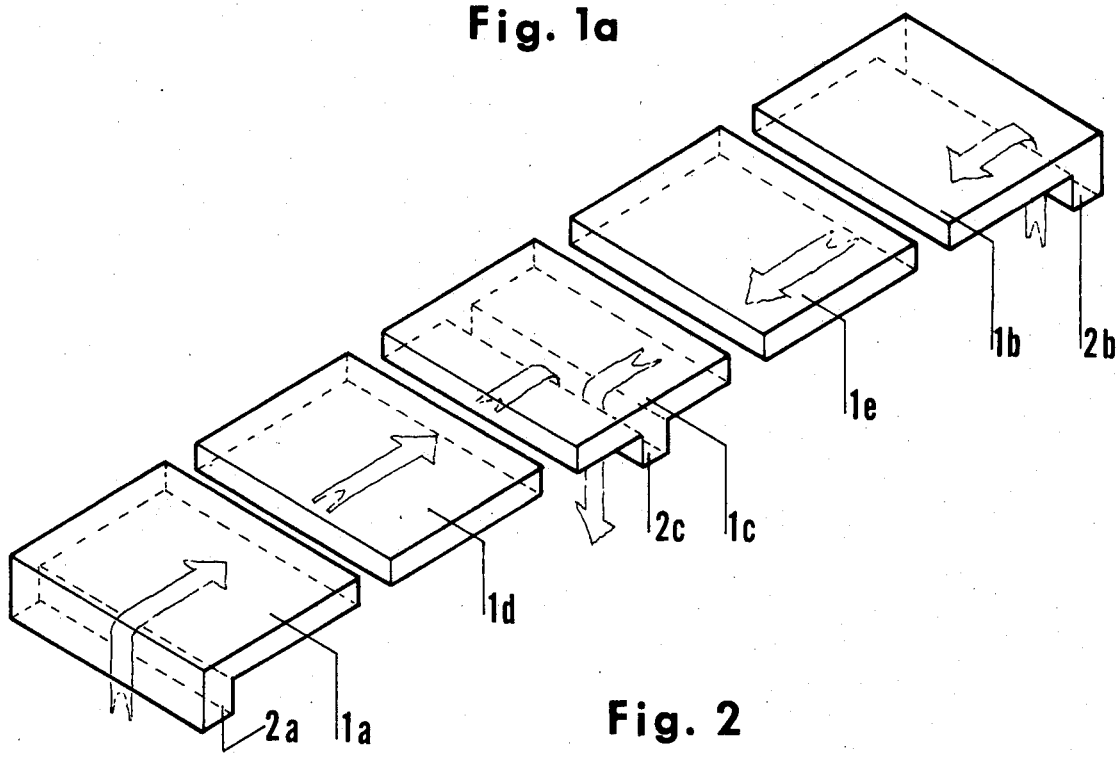
FIG. 2 is an exploded perspective view of a preferred embodiment of the heating chamber of FIG. 1.

Referring now to FIG. 2, therein is shown an exploded view of a preferred embodiment of the heating chamber of the present invention. The chamber is composed of five sections 1a, 1b, 1c, 1d, and 1e. Each section may be about eight feet long and about three feet wide so that practically any local sheet metal shop can fabricate same. Sections 1a, 1b, and 1c include downwardly extending segments 2a, 2b, and 2c, respectively, to extend through respective holes in base 4 (e.g., see FIG. 1). Thus, there are two downwardly extending segments at opposite ends of the chamber, and a third segment at the half-way point of the chamber.

During operation of the heating chamber of FIG. 2, air enters the chamber through the openings at the extremities of protruding end segments 2a and 2b, and exits from the chamber through protruding center segment 2c. Sections 1d and 1e of the chamber do not include downwardly extending segments, because these sections simply connect center section 1c to end sections 1a and 1b.

Figure 3:
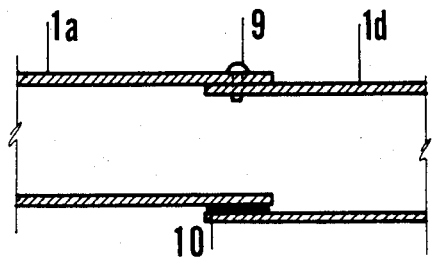
FIG. 3 is a cross-sectional view of the joining of two sections of the heating chamber of FIG. 2.

FIG. 3 illustrates the manner in which the sections of the preferred heating chamber may be joined together. That is, the roofs may be joined by pop rivets 9, while the floors may be joined by adhesive caulking 10.

Figure 4:
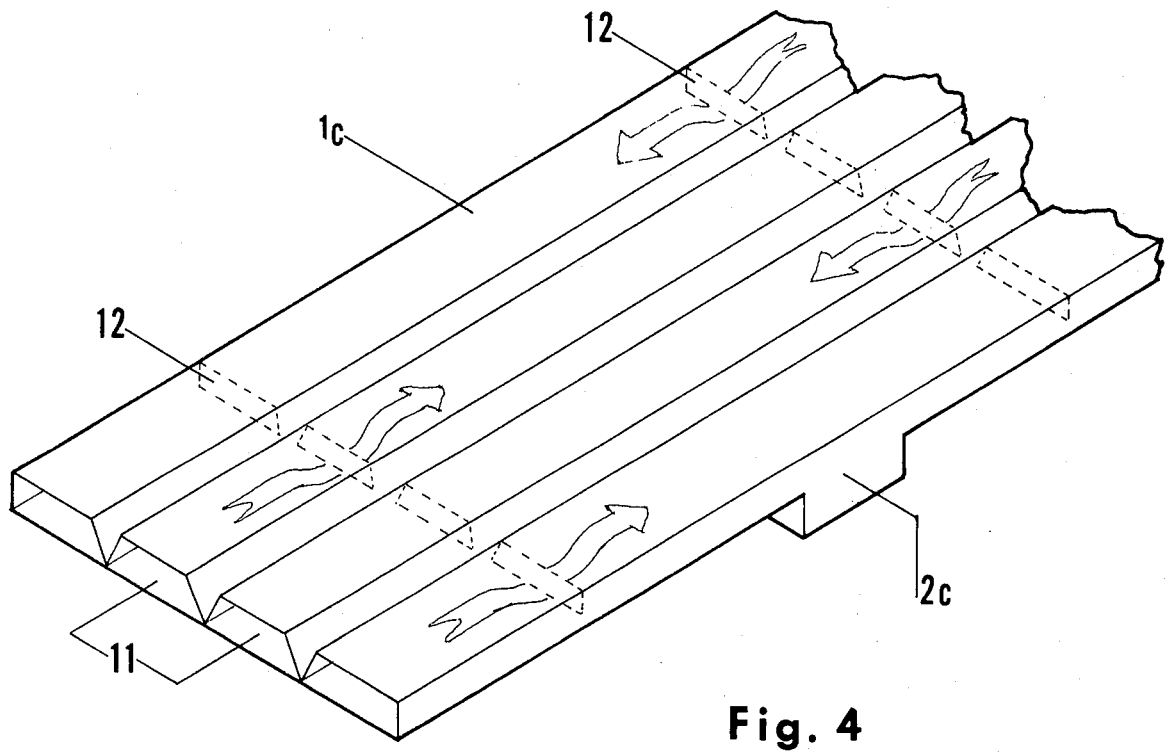
FIGS. 4 and 4a are perspective and cross-sectional views of one section of the heating chamber of FIG. 2.
Figure 4A:
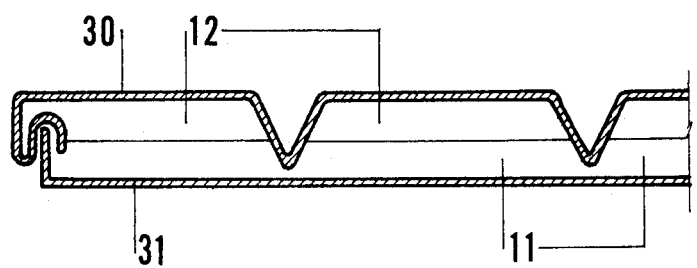

As illustrated in the close-up view of chamber section 1c in FIGS. 4 and 4a, each section is preferably made up of a plurality of side-by-side elongated channels 11 each of which are substantially closed except for the end thereof. In addition to being open at their ends, the parallel channels in section 1c are open at the half-way point of the channels to communicate with downwardly extending segment 2c. Thus, in this embodiment segment 2c (as well as the other downwardly extending segments 2a and 2b) function as air manifolds for the channels 11.

As also shown in FIGS. 4 and 4a, each channel includes a plurality of transverse partitions 12 extending downward from the ceiling, which partially obstruct flow of air therethrough and thereby create turbulence which results in more intimate contact between the air and the heated ceiling. In addition, the fact that the partitions 12 are located in the ceiling causes them to become directly heated by solar energy, thereby providing more heating area for the air travelling through the chamber.

Figure 5:
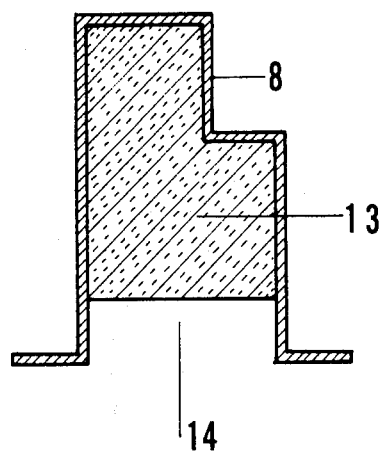
FIGS. 5 and 5a are cross-sectional views of a preferred embodiment of the glazing support of FIG. 1.

Referring now to FIG. 5, therein is shown in cross-section a preferred embodiment of glazing support 8. The supports are hollow and include an opening at the bottom thereof. Preferably, they are manufactured in eight-foot lengths from extruded metal, e.g., aluminum. As is well known in the greenhouse glazing art, each support may include end flanges (not shown) to permit joining one support to another by means of pop-riveting.

Figure 5A:
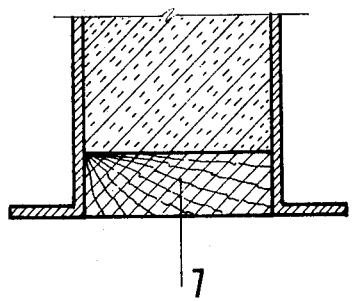

It can further be seen from FIGS. 5 and 5a that the kit includes rigid insulation pieces 13 (e.g., isocyanurate) inserted into the glazing supports. These pieces are sized (i.e., properly dimensioned) to snuggly fit totally within each glazing support in a position recessed from the bottom thereof, so as to define a slot 14 keyed to the shape and size of guide strips 7. In this manner, the glazing supports snuggly fit on top of, as well as along the sides of each guide strip 7.

Figure 6:
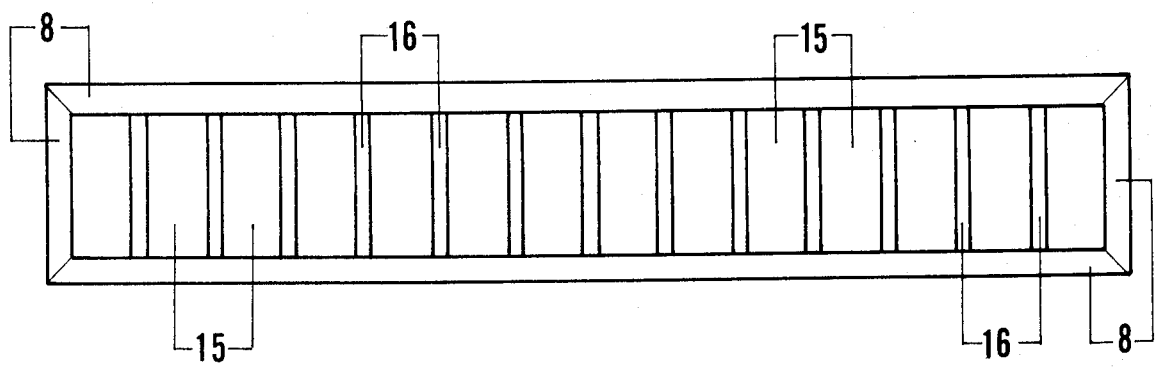
FIG. 6 is a top view of a preferred embodiment of the assembled kit.

Referring now to FIG. 6, therein is shown a top view of an embodiment of the present invention which accommodates a plurality of glazing panes 5. The structure is approximately 40 feet long to accommodate the 40 foot chamber depicted in FIG. 2, and each pane may be a standard piece of tempered glass, $\frac{1}{8} \times 34 \times 76$ inches. The perimeter of the chamber is surrounded by primary glazing supports 8. In addition to said supports 8, there are a plurality of intermediate supports 16 which extend between and are connected to parallel primary supports 8.

Figure 7:
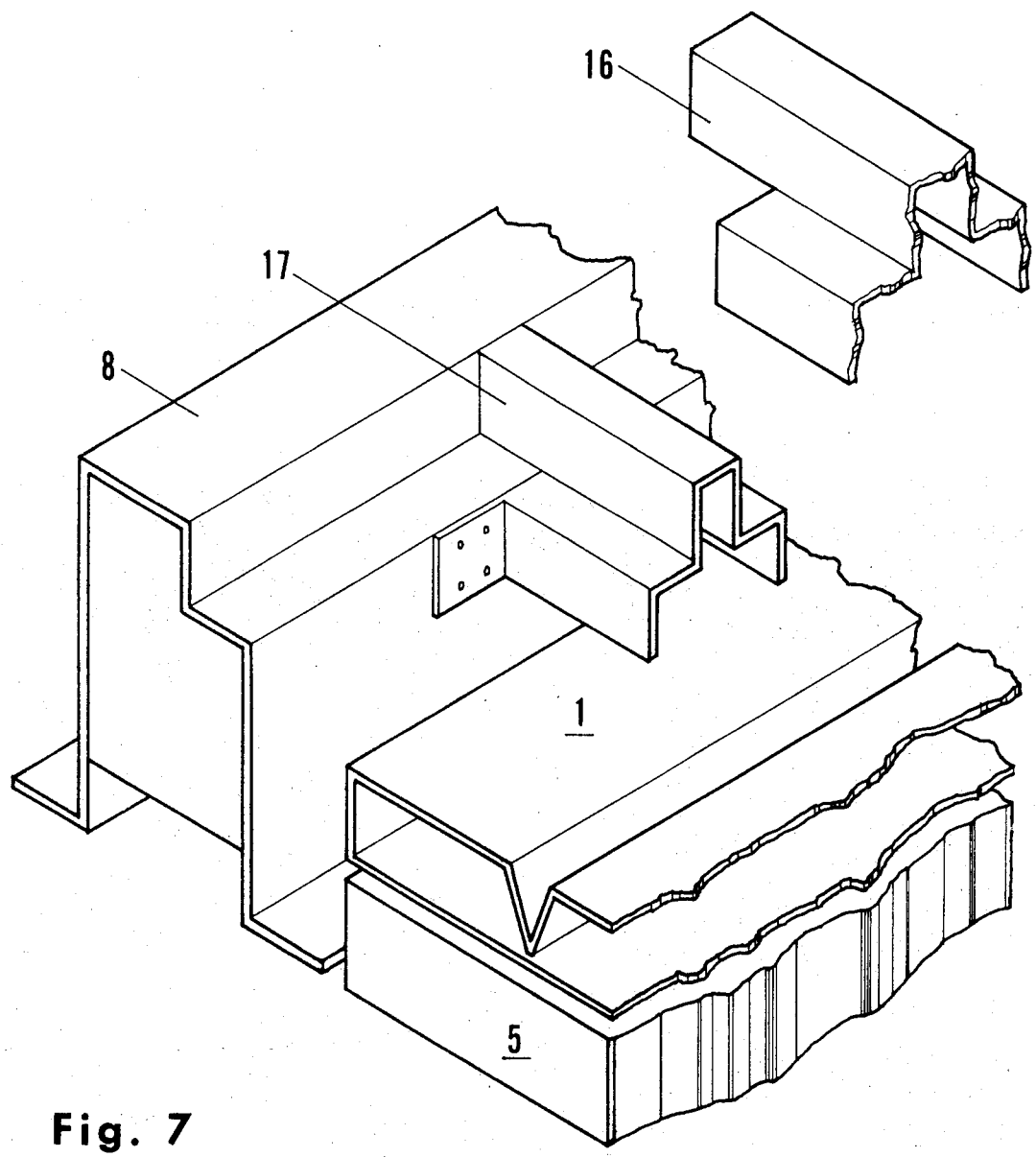
FIG. 7 is a perspective, partially exploded view of a primary glazing support and cross support.
Figure 7A:
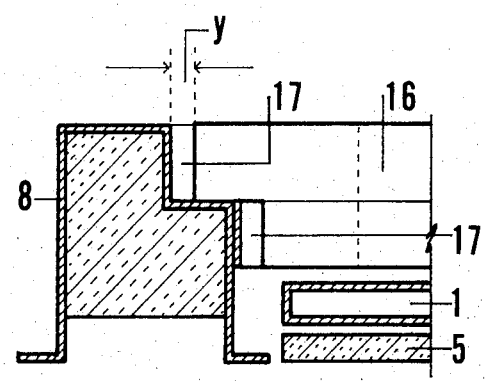
FIG. 7a is a cross-sectional view of FIG. 7.

FIGS. 7 and 7a illustrate how the intermediate supports 16 in FIG. 6 are connected to the primary supports 8. Referring thereto, a plurality of supporting arms 17 are pop-riveted or otherwise transversely attached to each of the parallel primary supports 8 at a plurality of predetermined and premarked points along such supports. The support arms are very short, e.g., they are a small fraction of the length of intermediate supports 16, usually about $1\frac{1}{2}$ inches long.

After arms 17 are attached to supports 8, each end of each intermediate support 16 is snuggly fitted over one of such arms, e.g., supports 16 may be snap-fitted over arm 17. Each support 16 provides two ledges for holding glazing panes.

It can be seen from FIG. 7a that support 16 rests on the ledge of support 8, as well as on arm 17, and that each support 16 is slightly shorter than the actual distance between parallel supports 8, i.e., see gap y. This differential in length provides for easy placement of the supports 16 between parallel primary supports 8, and further provides for subsequent expansion and contraction of the overall structure.

Figure 8:
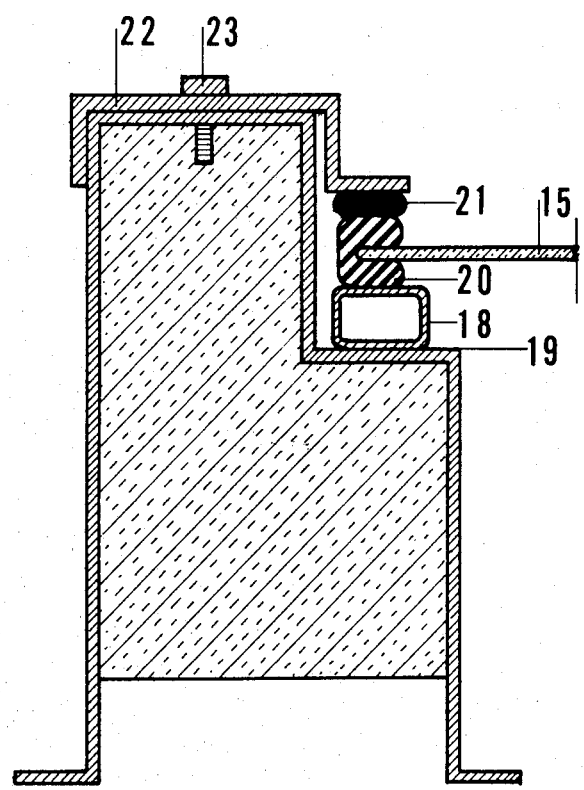
FIG. 8 is a cross-sectional view of an assembled glazing support and glazing.

Once the primary and intermediate supports are in place, glazing panes 15 may be secured to the structure in the prior art manner. For example, referring to FIG. 8, an extruded aluminum bench 18 is attached, e.g., glued, to the ledge 19 of primary supports 8 (and to similar ledges on intermediate supports 16). Each pane is edged with a rubber gasket 20 and placed on top of the benches. A caulking sealant 21 is beaded along the top of the gasket, and then the structure is capped with an elongated sheet metal cap 22 which is attached to the elongated supports by means of screws 23. Whenever adjacent metal cap members are joined to one another, they may be caulked for further sealing.

After assembly of the kit, air ducts (not shown) are attached to the extremities of downwardly extendind segments 2a-c in the prior art manner, to establish communication between the heating chamber 1 and the house and/or heat storage (e.g., a bed of rocks). Fans, electrical sensors and other controls (not shown) may be incorporated into the system as will be obvious to those skilled in the art.

While the preferred structure of the present invention has been described with specified materials and dimensions, it will be obvious to those skilled in the art that other materials and dimensions may be readily employed, and in fact other materials and dimensions may be more practical depending upon the location and requirements of the unit. Furthermore, it will be apparent that the kit may include a plurality of side-by-side heating chambers.

I claim:

1. In an apparatus for heating air with solar energy, wherein said air is heated in a chamber disposed below a glazing, the improvement wherein said apparatus comprises a kit capable of on-site assembly upon a planar-shaped base, wherein said kit comprises:
   a. a prefabricated heating chamber to be placed upon said base, said chamber being essentially closed on its roof and along two parallel sides, said chamber being substantially closed on its floor, said chamber including a protruding segment extending downwardly from said floor and being open at its extremity, said protruding segment being of sufficient length to extend through a hole in said base when said kit is assembled;
   b. a plurality of guide strips to be attached to the top of said base, wherein said strips surround the perimeter of said chamber when said kit is assembled;

c. a plurality of elongated pieces of rigid insulation;

d. a plurality of elongated glazing supports to be attached to the top of said base; wherein said supports are hollow and are open along the bottom thereof; wherein said insulation is sized to snuggly fit totally within each of said supports in a position recessed from said bottom of said supports, wherein said recess defines a slot in said bottom of said supports, wherein said slot is keyed to the size and shape of said guide strips so that said supports snuggly fit on top of as well as along the sides of said guide strips when attached to the top of said base; and wherein said supports provide a glazing frame when attached to the top of said base.

2. The apparatus of claim 1 wherein said chamber includes a plurality of side-by-side elongated channels, each channel being substantially closed except for the ends thereof; and wherein said protruding segment is in communication with each channel.

3. The apparatus of claim 1 wherein said kit further includes a plurality of intermediate elongated glazing supports to extend between parallel supports of the first-mentioned glazing supports when said kit is assembled; wherein said intermediate supports, in combination with said first-mentioned supports, provide a plurality of glazing supports frames when said kit is assembled.

4. The apparatus of claim 3 wherein said chamber includes a plurality of side-by-side elongated channels, each channel being substantially closed except for the ends thereof; and wherein said protruding segment is in communication with each channel.

5. The apparatus of claim 3 wherein said kit further includes a plurality of support arms to be transversely attached to said parallel supports of said first-mentioned supports when said kit is assembled, wherein each of said arms is a small fraction of the length of said intermediate supports, wherein each member of said intermediate supports is snuggly fitted over and supported at each end by one of said arms when said kit is assembled, and wherein each of said intermediate supports is slightly shorter than the actual distance between said parallel supports.

6. The apparatus of claim 5 wherein said chamber includes a plurality of side-by-side elongated channels, each channel being substantially closed except for the ends thereof, and wherein said protruding segment is in communication with each channel.

7. The apparatus of claim 6 wherein each channel includes a plurality of transverse partitions which partially obstruct flow of air therethrough.

8. The apparatus of claim 6 wherein said heating chamber includes three protruding segments extending downward from the bottom thereof, wherein two of said segments are located at opposite ends of said channels, wherein the third segment is located at the halfway point in said channels, wherein air enters said heating chamber through said segments at said opposite ends, and exists therefrom through said third segment, wherein each of said segments extends through a respective hole in said base when said kit is assembled.

9. In an apparatus for heating air with solar energy, wherein said air is heated in a chamber disposed below a glazing, the improvement wherein said apparatus comprises a kit capable of on-site assembly upon a planar-shaped base, wherein said kit comprises:

a. a heating chamber to be placed upon said base;

b. a plurality of guide strips to be attached to the top of said base, wherein said strips surround the perimeter of said chamber when said kit is assembled;

c. a plurality of elongated pieces of rigid insulation;

d. a plurality of elongated glazing supports to be attached to the top of said base; wherein said supports are hollow and are open along the bottom thereof; wherein said insulation is sized to snuggly fit totally within each of said supports in a position recessed from said bottom of said supports; wherein said recess defines a slot in said bottom of said supports, wherein said slot is keyed to the size and shape of said guide strips so that said supports snuggly fit on top of as well as along the sides of said guide strips when attached to the top of said base; and wherein said supports provide a glazing frame when attached to the top of said base.

10. The apparatus of claim 9 wherein said kit further includes a plurality of intermediate elongated glazing supports to extend between parallel supports of the first-mentioned glazing supports when said kit is assembled; wherein said intermediate supports, in combination with said first-mentioned supports, provide a plurality of glazing supports frames when said kit is assembled.

11. The apparatus of claim 10 wherein said kit further includes a plurality of support arms to be transversely attached to said parallel supports of said first-mentioned supports when said kit is assembled, wherein each of said arms is a small fraction of the length of said intermediate supports, wherein each member of said intermediate supports is snuggly fitted over and supported at each end by one of said arms when said kit is assembled, and wherein each of said intermediate supports is slightly shorter than the actual distance between said parallel supports.

* * * * *

UNITED STATES PATENT AND TRADEMARK OFFICE
CERTIFICATE OF CORRECTION

PATENT NO. : 4,284,070
DATED : August 18, 1981
INVENTOR(S) : Douglas A. Wilke

It is certified that error appears in the above—identified patent and that said Letters Patent is hereby corrected as shown below:

On the Title page Item [73] Assignee should read:
--The United States Government, as represented by the Secretary of Agriculture--.

Item [76] "Douglad A. Wilke" should read --Douglas A. Wilke--.

Signed and Sealed this

Twenty-seventh Day of April 1982

[SEAL]

Attest:

GERALD J. MOSSINGHOFF

Attesting Officer

Commissioner of Patents and Trademarks